United States Patent [19]

Itoh

[11] Patent Number: 5,212,692

[45] Date of Patent: May 18, 1993

[54] HELP FUNCTION GENERATION APPARATUS AND METHOD

[75] Inventor: Hiroshi Itoh, Tokyo, Japan

[73] Assignee: Toshiba Kikai Kabushiki Kaisha, Tokyo, Japan

[21] Appl. No.: 605,855

[22] Filed: Oct. 31, 1990

[30] Foreign Application Priority Data

Oct. 31, 1989 [JP] Japan ................................. 1-284174

[51] Int. Cl.⁵ .............................................. G06F 11/00
[52] U.S. Cl. ................................. 371/5.1; 371/29.1; 371/5.5; 364/474.22; 364/474.27
[58] Field of Search ....................... 371/5.1, 29.1, 25.1, 371/57.1; 395/700, 12, 155; 364/474.22, 474.27

[56] References Cited

U.S. PATENT DOCUMENTS

| 4,339,657 | 7/1982 | Larson et al. | 371/5.1 |
| 4,446,525 | 5/1984 | Hoch et al. | 364/474.23 |
| 4,827,520 | 5/1989 | Zeinstra | 381/43 |
| 4,964,077 | 10/1990 | Eisen et al. | 364/900 |
| 5,115,501 | 5/1992 | Kerr | 395/600 |
| 5,159,558 | 10/1992 | Seki et al. | 364/474.27 |

FOREIGN PATENT DOCUMENTS 62-57063 3/1987 Japan.

OTHER PUBLICATIONS

"APS Text Search & Retrieval Classroom Manual", Planning Research Corp., May 1987.

Primary Examiner—Robert W. Beausoliel, Jr.
Assistant Examiner—Ly V. Hua
Attorney, Agent, or Firm—Cushman, Darby & Cushman

[57] ABSTRACT

A method and apparatus for automatically outputting an operation guidance message. An operation guidance message is output if an operator repeatedly inputs an erroneous command. A processing unit processes a command input by an input unit. An observation unit judges whether an error occurs in the command and compares the number of errors with a constant. An output unit outputs the operation guidance message when the number of errors matches the constant.

10 Claims, 5 Drawing Sheets

HELP FUNCTION GENERATION APPARATUS AND METHOD

BACKGROUND OF THE INVENTION

1. Field of the Invention

This invention relates to an electronic apparatus having a man-machine interface. More specifically this invention relates to an apparatus and method having a help function display which explains operation errors or alarm messages which are generated by an operator's error.

2. Detailed Description Of The Prior Art

Apparatus having a man-machine interface has been used for inputting and sending data and commands to a processor.

These man-machine interfaces have an input unit and a output unit, such as a keyboard and a display. Input data, commands and responses from the processor are output and displayed on the display. An operator confirms the data or commands and proceeds to the next operation as prompted by messages on the display.

Several kinds of apparatus can beneficially have such a man-machine interface, such as computer peripheral equipment, workstations, numerical control apparatus, word processors and the like. Operators need not have any special engineering training to use such apparatus, but may have backgrounds ranging from that of a general customer to an expert who has special knowledge.

In general, messages which are displayed in response to errors are produced beforehand and stored in a memory. In one type of system, messages are automatically displayed in response to an error. In another type of system, messages are displayed upon the operator is request indicated by depressing a key. The displaying of this message is called "the help function" and the key which is used for triggering the display is called the help key. Recently the number of systems having such a help function has been increasing.

In the related art, the first type of system referred to above automatically displays the messages when an alarm has been generated or the operator has made a mistake. This is a convenience for a less knowledgeable person. However, it is troublesome for a person who has a high level of knowledge, and it reduces the processing speed of the apparatus.

In the second type of system, where error messages are generated only when an operator depresses a help key, the operator must first realize that he or she has made a mistake. It is difficult to know all of the procedures and commands even if the operator is skilled in the operation of the apparatus. Thus with such systems, the operator often cannot decide whether or not to use the help function. This increases an operator's workload, mistakes and stress.

Accordingly, it has been desirable to provide an apparatus which has a help function for automatically outputting messages without an operator's manual actuation after the operator has made a series of mistakes in inputting a command, without bothering an operator with a message every time a mistake is made. Such a system would decrease the operator's work load and stress.

SUMMARY OF THE INVENTION

It is an object of the present invention to provide an apparatus which has a help function for automatically generating guidance for helping an operator initiate an operation.

It is another object of the present invention to provide a method for generating guidance for responding to an error signal in order to assist an operator.

According to the present invention, an apparatus for generating operation guidance includes input means for inputting a command. Processing means processes the command input by the input means. Observation means judge whether an error exists in the command. Also, the number of errors is counted. When the number of errors reaches a predetermined constant, a display start signal is generated, and output means outputs an operation guidance message based on the display start signal.

Another aspect of this invention is a method for generating an operation guidance message for an error command of an electric apparatus. The method begins by storing correct commands. An operator inputs an operation command for operating the electronic apparatus. The operation command and the correct commands are compared and an error signal is issued if the operation command is in error. The number of error signals is counted and that number is subtracted from a constant. Operation guidance is output when the number of error signals reaches the constant.

BRIEF DESCRIPTION OF THE DRAWINGS

The invention can be fully understood by reference to the accompanying drawings in which.

DESCRIPTION OF THE PREFERRED EMBODIMENT

A preferred embodiment of the present invention will now be described in more detail with reference to the accompanying drawings.

Figure 1:
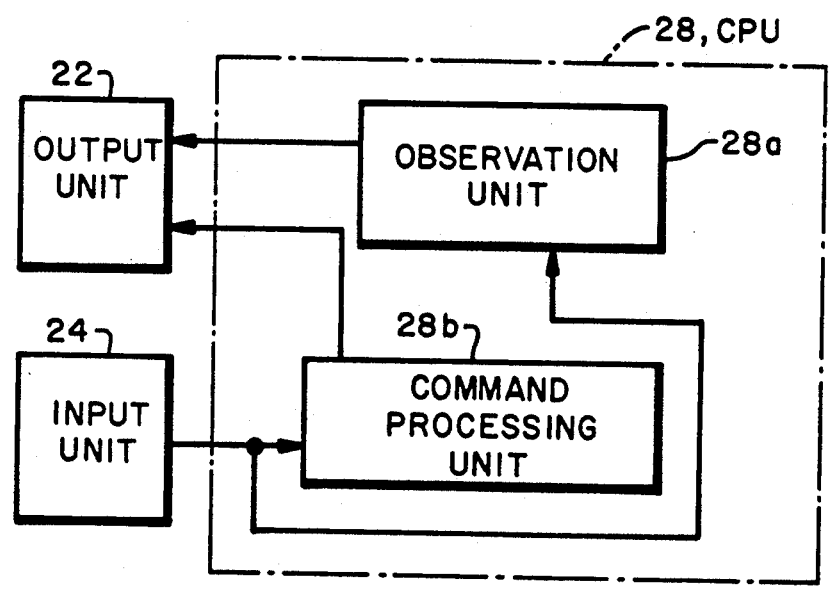
FIG. 1 shows a block diagram of the help function generation apparatus of the present invention.

As shown in FIG. 1, the help function generation apparatus of the present invention includes input unit 24, output unit 22 and central processing unit 28. Input unit 24 provides a plurality of key switches and a help key which generates a request signal for displaying an explanation of an operation. Data and commands which are input from input unit 24 are processed in central processing unit 28. Central processing unit 28 provides observation unit 28a and command processing unit 28b. Observation unit 28a observes the command and also recognizes whether or not the command is invalid or erroneous. If the command is invalid or erroneous, observation unit 28a counts the number of errors and, when the number exceeds a threshold, causes output unit 22 to display a message which shows a method to correct the error. Accordingly, observation unit 28a provides an input recognition means and an error counter means. Command processing unit 28b executes the command and the data which are input from input unit 24.

Input unit 24 includes a help key. When an operator depresses the help key to request an operation guidance display, a suitable message at that time is displayed on output unit 22, such as on a CRT display, a liquid crystal display, or the like.

Hereinafter is described a case in which the present invention is applied to a numerical control apparatus (NC apparatus).

Figure 2:
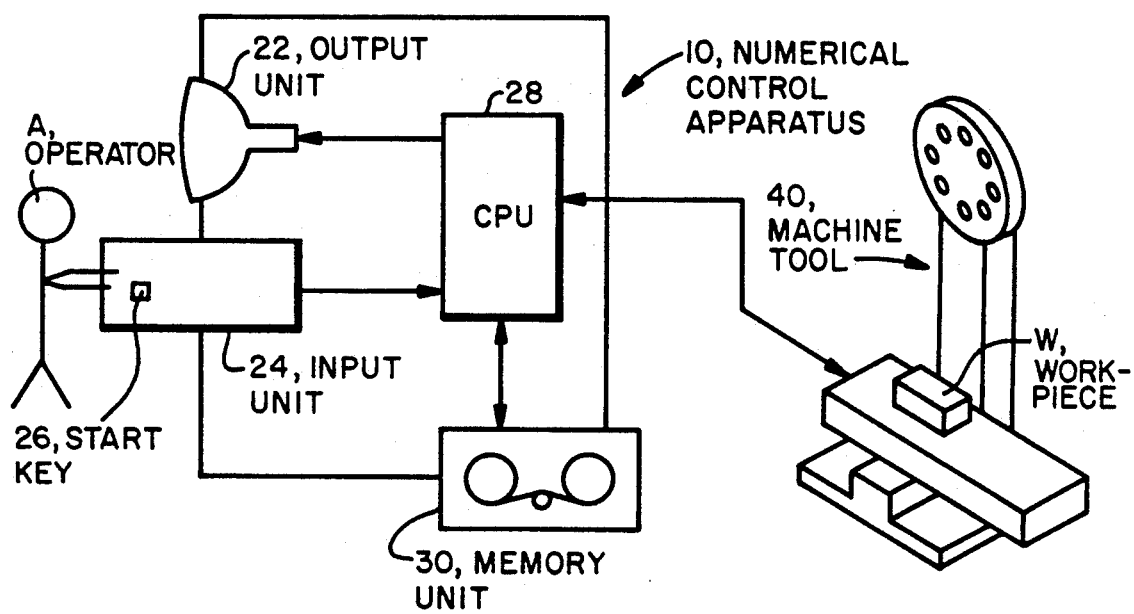
FIG. 2 shows a block diagram of the numerical control (NC) apparatus having a help function generation apparatus, to which the present invention is applied.

A numerical control apparatus having a help function generation apparatus of the present invention is shown in FIG. 2. The numerical control apparatus 10 includes input unit 24, output unit 22, and central processing unit 28.

Input unit 24 includes a keyboard unit and output unit 22 includes a CRT display unit. Central processing unit 28 includes observation unit 28a and command processing unit 28b.

A micro-processor is used in central processing unit 28. Numerical control apparatus 10 also includes memory unit 30 in which a machining program (NC program) is stored. Numerical control apparatus 10 controls machine tool 40 in accordance with a machining program selected and read from memory unit 30, which causes workpiece W to be machined.

The machining program is selected by operator A using input unit 24. When a cycle start key 26, which is installed on input unit 24, is depressed, command processing unit 28b in central processing unit 28 reads the machining program which is selected from memory unit 30. Numerical control apparatus 10, then, controls machine tool 40.

Figure 3:
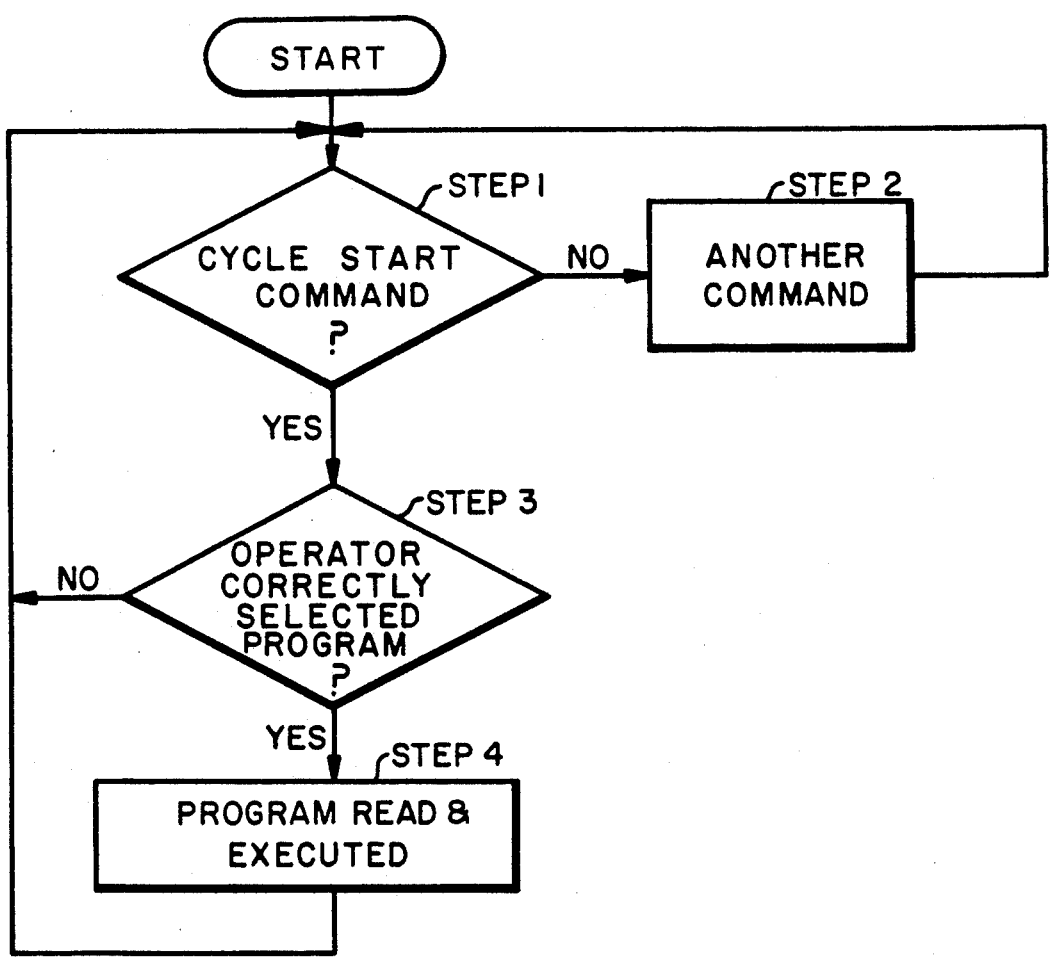
FIG. 3 is a flowchart which shows the operation of the processing unit of the embodiment.

The operation of command processing unit 28b will be described next. A flowchart of the operation of command processing unit 28b is shown in FIG. 3. First, operator A plans to machine and sets workpiece W on machine tool 40. Operator A then selects a machining program (NC program) by inputting a program name, identification name, or the like. Keyboard switches are normally used in the numerical control apparatus of the embodiment. When operator A depresses cycle start key 26, command processing unit 28b checks, at step 1, if it is a "cycle start command" or not. If the input command is not "cycle start command", command processing unit 28b checks whether it is another command or not (see step 2). If the input command was a "cycle start command," command processing unit, at step 3, checks whether operator A has correctly selected the machining program or not. If operator A correctly selects the machining program, command processing unit 28b reads the selected program from memory unit 30, and executes the program at step 4. Machine tool 40 is controlled by the program which is selected by operator A.

When a machining program name is not correctly selected, "cycle start" command is invalid. In such a case, a process is used by observation unit 28a as shown in the flowchart of FIG. 4.

Figure 4:
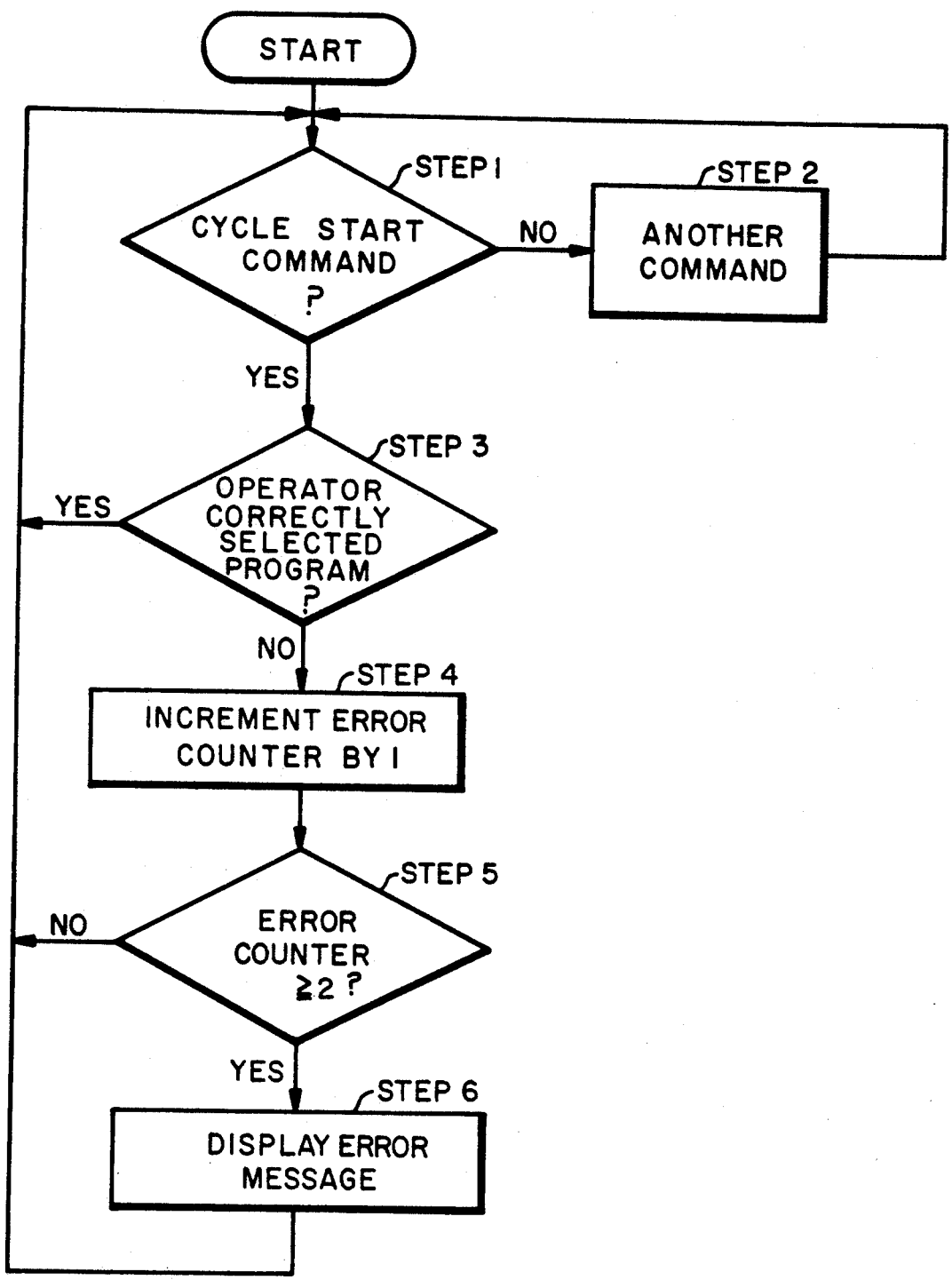
FIG. 4 is also a flowchart which shows the operation of the observation unit of the embodiment.

Observation unit 28a performs a similar process in steps 1-3 in FIG. 4 as command processing unit 28b performs in steps 1-3 in FIG. 3. When a machining program name is incorrectly selected in step 3, observation unit 28a executes step 4 in FIG. 4 by incrementing an error counter by one. Then, at step 5, the value in the error counter is compared to a value which is set beforehand in a constant counter. When the counted value in the error counter reaches the value which is set beforehand, at step 6 a message is displayed on output unit 22. The message contains a status of the error and the manner in which operator A should respond to the error. As the message is displayed, the error counter is cleared and the counted value becomes zero.

Generally speaking, if machine tool 40 does not operate when the cycle start command is input, operator A depresses the help key switch and receives a message to explain how to start the operation. If operator A becomes aware he input an inappropriate machining program name, he selects an appropriate machining program and reoperates the machine tool.

However, if operator A does not realize his error, he inputs the cycle start command again and repeats his operation. In such a case, observation unit 28a counts the number of his erroneous operations and provides an error message when the number of errors reaches a predetermined value. For example, if the same error is repeated the designated number of times, a message corresponding to his error is automatically output and displayed on the output unit 22, such as a CRT display or the like.

Figure 5:
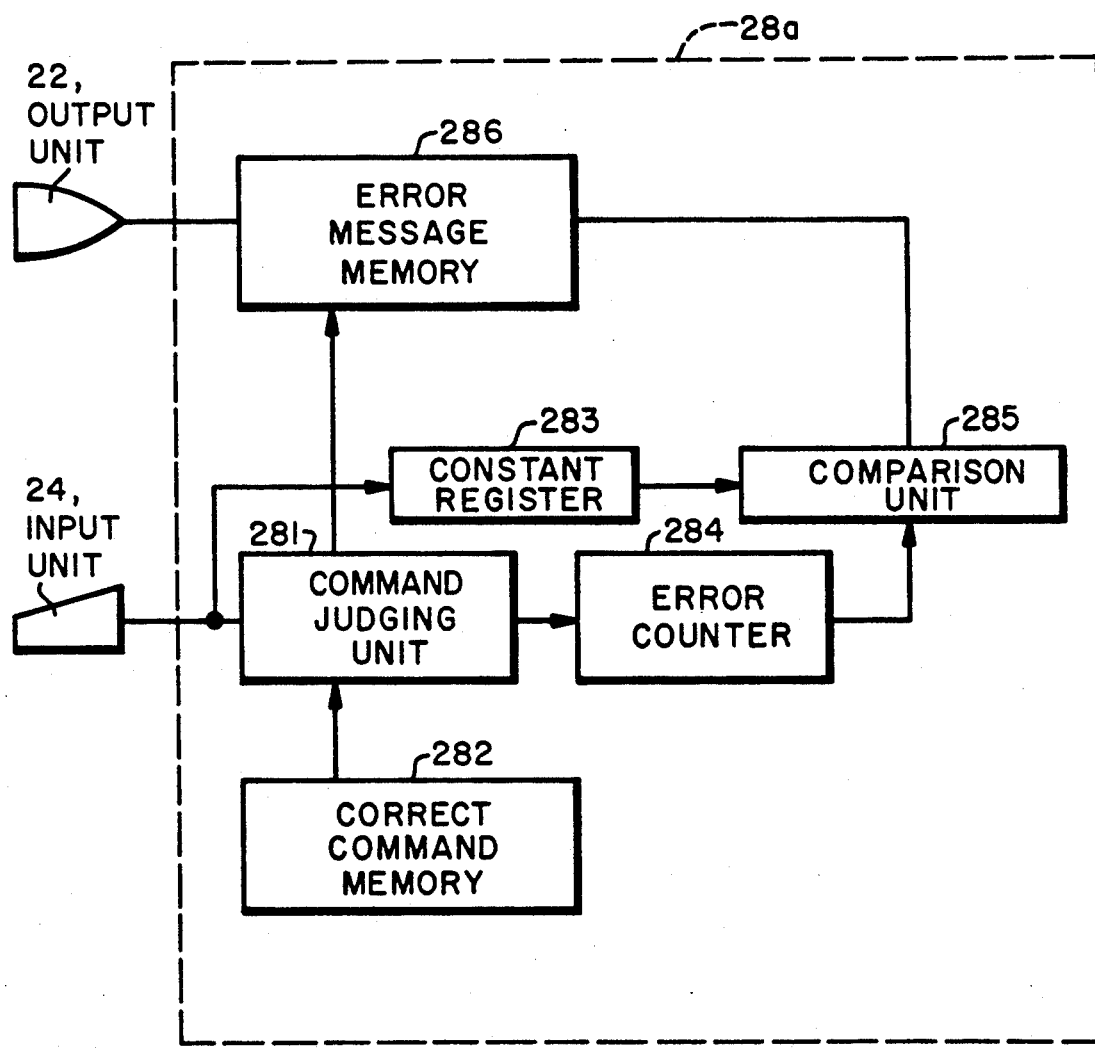
FIG. 5 is a block diagram of the observation unit according to the present invention.

An internal block diagram of observation unit 28a is shown in FIG. 5. Observation unit 28a includes a command judging unit 281, correct command memory 282, constant register 283, error counter 284, comparison unit 285, and error message memory 286.

Input signals from input unit 24 are connected to command judging unit 281 and constant register 283. A constant value is input from input unit 24 and stored in constant register 283. The output signal of constant register 283 is connected to comparison unit 285. Command data input from input unit 24 is sent to command judging unit 281. Data from correct command memory 282 are sent to judging unit 281 and the output of judging unit 281 is connected to error counter 284. The number of errors is stored in error counter 284. Data from constant register 283 and from error counter 284 are sent to comparison unit 285. When a match occurs, a signal from comparison unit 285 is sent to error message memory in which several error messages are stored. The signal from comparison unit 285 enables the output of a message based on the error which is selected by judging unit 281. The output from error message memory 286 is sent to output unit 22, such as a CRT display in this embodiment.

In operation, operator A sets a constant, for example, the number "two", in constant register 283 prior to the operation of the apparatus as a parameter. Operator A, then, starts his operation and inputs commands. Judging unit 281 judges the commands in comparison to the command set in correct command memory 282. If operator A has correctly generated a command, judging unit 281 clears error counter 284. Comparison unit 285 compares the contents of both constant register 283 and error counter 284 and no message is enabled in this case.

If operator A inputs a command incorrectly, judging unit 281 judges the command to be error, and outputs a error signal to error counter 284.

Then, if operator A repeats the erroneous operation, judging unit 281 repeatedly outputs an error signal. Eventually the count in error counter 284 matches the number in constant register 283. Comparison unit 285 then generates a message output enable signal, and judging unit 281 selects the message based on the operator's error. The message selected by judging unit 281 is output to output unit 22 and the message is displayed on output unit 22. Accordingly, in the case of a cycle start command, the operator could receive a message that a machining program is not selected.

Although the embodiment described above shows an example in which the present invention is applied to a numerical control apparatus which controls a machine tool, it should be understood that the present invention is also applicable to other electronic apparatus, such as a robot controller, programmable controller or the like.

Further, although the embodiment is described in the context of an example in which an error in the cycle start command is used, any other kind of command also could be explained in a similar manner.

Also, a general purpose micro-processor can be employed for observation unit 28a and command processing unit 28b. Read only memories (ROMs) and random access memories (RAMs) also can be employed. For example, a micro-processor may be used to perform the functions of observation unit 28a, judging unit 281 and comparison unit 85. A control program for the present invention would be stored in a ROM. Another ROM may be used as correct command memory 282 and error message memory 286. Constant register 283 and error counter 284 may be implemented by RAMs and controlled by the micro-processor. Input and output interface circuits may also be used and controlled by the microprocessor using a control program stored in the ROMs. The input and output interface circuits may be connected to input unit 24, output unit 22 and memory unit 30. The data from these units are controlled by the microprocessor.

As described above, according to the present invention, operation guidance messages can be automatically generated. Even if the operator of the apparatus is not aware of an error he has generated, guidance concerning the erroneous operation is generated and displayed on a display unit. Thus, if the operator has not mastered the operation procedure or input commands, the operator can easily receive instructions. This reduces an operator's workload and stress.

In summary this invention provides a electronic apparatus which automatically generates operation guidance messages without the operator's command.

What is claimed is:

1. A numerical control apparatus for operating a machine tool and generating an operation guidance message, comprising:

input means for inputting a command for operating a machine tool;

memory means for storing a plurality of programs each of which control an operation of said machine tool;

observation means for judging whether said command input by said input means is a correct command and outputting a display enable signal when said observation means judges that incorrect commands have been inputted by said input means a predetermined number of times;

cycle start command means for reading one of said programs stored in said memory means in order to start an operation of said machine tool when said command input by said input means is judged to be correct by said observation means; and output means for outputting said operation guidance message based on said display enable signal output by said observation means.

2. The apparatus of claim 1, wherein said observation means includes:

constant register means for storing said predetermined number;

command storage means for storing predetermined correct command data;

judging means for judging whether said command input by said input means is correct based on said predetermined correct command data and outputting an error signal each time said command is judged not to be correct;

error counter means for counting a number of said error signals output by said judging means;

comparison means for comparing said predetermined number stored in said constant register means with said number stored in said error counter means and outputting said display enable signal when said number stored in said error counter means equals said predetermined number stored in said constant register means; and display message storage means for storing said display enable signal output by said comparison means.

3. The electronic apparatus of claim 2, wherein said judging means includes a micro-processor.

4. The electronic apparatus of claim 2, wherein said comparison means includes a micro-processor.

5. The electronic apparatus of claim 2, wherein said constant register means includes a semiconductor random access memory.

6. The electronic apparatus of claim 2, wherein said error counter means includes a semiconductor random access memory.

7. The electronic apparatus of claim 2, wherein said command storage means includes a read only memory.

8. The electronic apparatus of claim 2, wherein said display message storage means includes a semiconductor read only memory.

9. A method for operating a machine tool and outputting an operation guidance message in a numerical control apparatus, comprising the steps of:

inputting an operation command for operating said numerical control apparatus;

storing a predetermined number, a plurality of programs each of which control an operation of said machine tool and correct command data;

comparing said operation command to said correct command data in order to determine if said operation command is correct;

reading one of said programs in order to start an operation of said machine tool when said operation command is determined to be correct;

issuing an error signal each time said operation command is determined not to be correct;

counting a number of said error signals;

comparing said predetermined number to said number of error signals; and outputting said operation guidance message if said number error signals is greater than said predetermined number.

10. The method of claim 9, wherein said outputting step includes the step of outputting a message indicating the correct command for operating the numerical control apparatus.

* * * * *